Oct. 29, 1968 R. H. ALLMARK ET AL 3,408,636

ELECTRIC DATA SHIFT REGISTER

Filed April 8, 1964 2 Sheets-Sheet 1

Oct. 29, 1968 R. H. ALLMARK ET AL 3,408,636

ELECTRIC DATA SHIFT REGISTER

Filed April 8, 1964 2 Sheets-Sheet 2

United States Patent Office 3,408,636

Patented Oct. 29, 1968

3,408,636

ELECTRIC DATA SHIFT REGISTER

Reginald Hugh Allmark and Warwick Reginald Abbott, Kidsgrove, Stoke-on-Trent, England, assignors to The English Electric Company Limited, London, England, a British company Filed Apr. 8, 1964, Ser. No. 358,158
Claims priority, application Great Britain, Apr. 11, 1963, 14,519/63; 14,520/63
3 Claims. (Cl. 340—174)

ABSTRACT OF THE DISCLOSURE

The specification describes apparatus for enabling groups of bits stored in a register to be gated in a parallel manner by a single gating signal into a second register either into corresponding elements of the register or with a shift, and subsequently to be gated in parallel by a single gating signal into the original register either into corresponding elements of the register or with a shift, whereby shifts along the register may be produced by successive parallel transfers to the second register and then to the original register.

Figure 1:
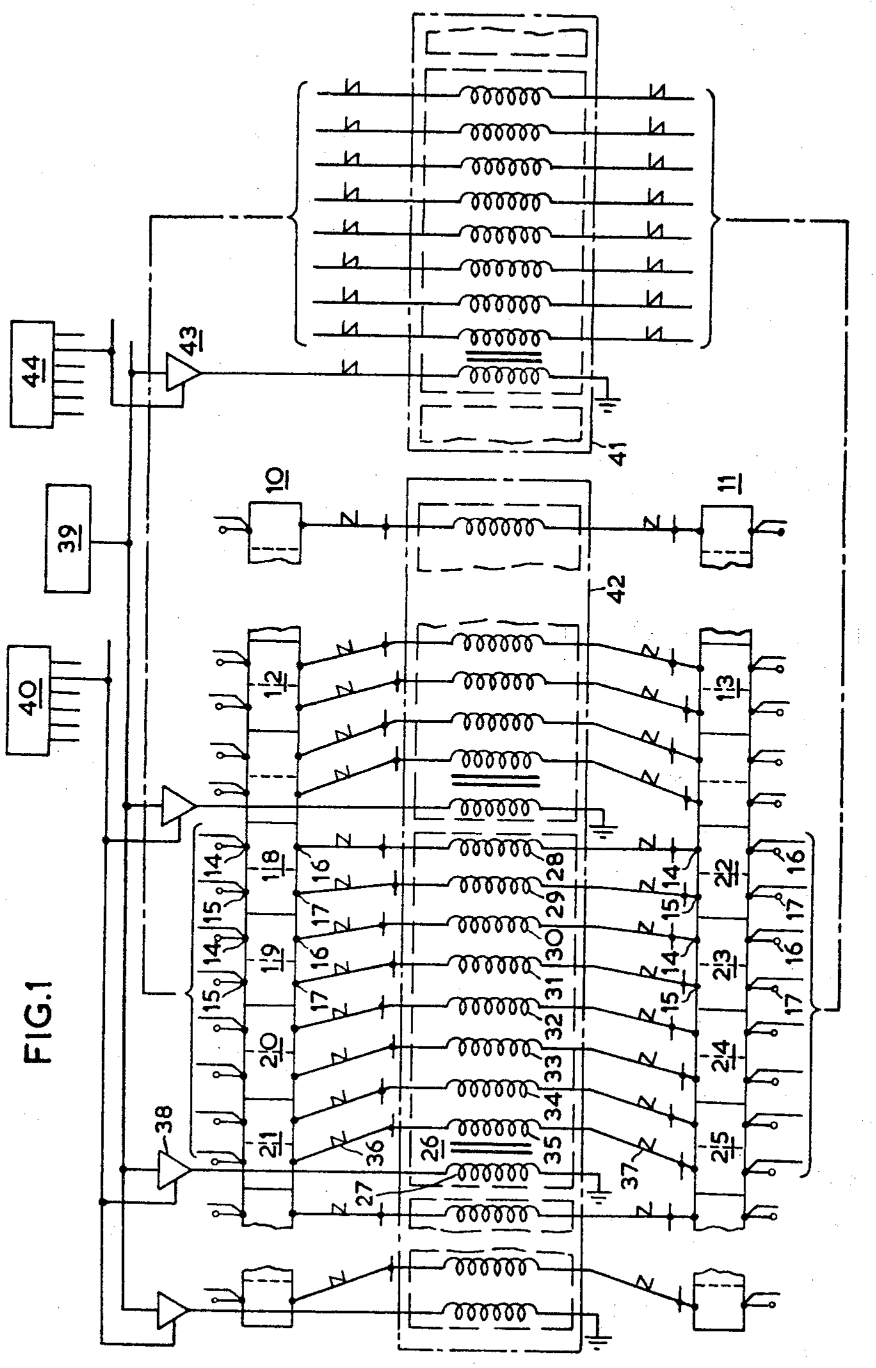

This invention relates to electric data transfer means and to arrangements incorporating such means.

According to the present invention an electric data transfer arrangement comprising a first group of bi-stable electric storage devices, a second group of bi-stable electric storage devices, each such storage device having SET and RESET input terminals for receiving SET and RESET input potential signals and TRUE and COMPLEMENT output terminals for delivering complementary output potential signals characteristic of the stable state of the device, a first group of pulse transformers for transferring data from the storage devices of the said first group into corresponding storage devices of the said second group, each such pulse transformer having a primary winding for energisation by a source of current pulses, a first secondary winding connected between the TRUE output terminal of a storage device in the said first group and the SET input terminal of the corresponding storage device in the said second group, and a second secondary winding connected between the COMPLEMENT output terminal of the said storage device in the said first group and the RESET input terminal of the said corresponding storage device in the said second group, the TRUE and COMPLEMENT output signals of each storage device in the said first group being ineffective on their own to cause any change in the state of the corresponding storage device in the said second group if the state of that storage device is not in correspondence with that of the said storage device in the said first group, and each pulse transformer being arranged to induce on energisation of its primary winding E.M.F.'s in its secondary windings such as in conjunction with the output potentials of the associated storage device in the said first group will cause the associated storage device in the said second group to assume the state corresponding to that of the said associated storage device in the said first group if the said associated storage device in the said second group is not already in that corresponding state, a second group of pulse transformers similar to the said first group of pulse transformers but having their respective pairs of secondary windings connected between the respective pairs of output terminals of the first group of storage devices and the respective pairs of input terminals of storage devices of the second group which are all displaced a predetermined number of devices in a predetermined sense from the respective corresponding devices of the second group, gating means for gating current pulses from a common supply source to the primary windings of either group of pulse transformers whereby to enable data stored in the first group of storage devices to be transferred into corresponding devices of the second group, or into devices of the second group displaced from the said corresponding devices of the second group, a third group of pulse transformers similar to the first group of pulse transformers but having the respective pairs of secondary windings connected between the respective pairs of output terminals of the second group of storage devices and the respective pairs of input terminals of the corresponding storage devices of the first group, and a fourth group of pulse transformers similar to the third group but having the respective pairs of secondary windings connected between the respective pairs of output terminals of the second group of storage devices and the respective pairs of input terminals of the storage devices of the first group which are displaced a predetermined number of devices in a predetermined sense from the corresponding devices of the first group, and a second gating means for gating current pulses from a common supply source to either the third or fourth group of pulse transformers whereby data stored in the second group of storage devices may be transferred into corresponding devices of the first group or into storage devices of the first group which are displaced from the said corresponding devices.

Other features of the present invention will appear from the following description of one electric data transfer apparatus embodying the present invention. This apparatus is described by way of example and with reference to the accompanying drawings which show in FIGS. 1 and 2 circuit diagrams of the relevant electric circuit connections of the apparatus.

Referring now to the drawings the data transfer apparatus comprises two similar data registers 10, 11, each of which comprises a number of similar bi-stable storage devices which are represented by divided rectangles such as 12, 13. Each storage device has SET and RESET input terminals 14, 15 and TRUE and COMPLEMENT output terminals 16 and 17. The storage devices of each register are arbitrarily and conveniently grouped into corresponding groups of four such as 18 to 21 and 22 to 25, and associated with each pair of corresponding groups of storage devices in the two registers is a pulse transformer such as 26.

Each such pulse transformer has a single primary winding 27 and four pairs of secondary windings 28 to 35, and each pair of secondary windings is connected between the output terminals of one of the storage devices in the left-hand register 10 and the input terminals of the corresponding storage device in the right-hand register 11. Of each such pair of secondary windings one such winding is connected between a TRUE output terminal and a SET input terminal, whilst the other is connected between a COMPLEMENT output terminal and a RESET input terminal. The connections of the respective secondary windings include diodes 36, 37 for preventing inter-action between the various storage devices in each register. The need for these will be apparent later.

The primary windings of the pulse transformers are connected on one side to earth, and on the other side through gates 38 to a common current pulse supply source 39, and the gates have control circuits for receiving simultaneously control pulses from one of the output circuits of a control device 40.

The apparatus so far described is all required for the purpose of transferring binary data stored in the storage devices of the left-hand register 10 into the corresponding storage devices of the right-hand register 11. In order to enable data to be transferred in the opposite sense between the two registers a further group 41 of pulse transformers similar to the first group 42 is provided, the pairs of secondary windings of each transformer of the group 41 being connected between the output terminals of the storage devices of the right-hand register 11 and the input terminals of corresponding storage devices of the left-hand register 10. The primary windings of the second group 41 of pulse transformers are all connected through gates 43 to the current pulse supply source 39, and these gates have control circuits for receiving simultaneously pulses from one of several output circuits of a second control device 44.

For the purpose of transferring data from the storage devices of the left-hand register 10 to storage devices of the right-hand register 11 which are displaced away from the corresponding storage devices of the register 11 by a predetermined number of devices five further groups 45 to 49 (FIG. 2) of pulse transformers are provided, each such group being similar to the group 42. These further groups of pulse transformers are not shown in FIG. 1 but only in FIG. 2, where for the sake of simplicity each group is represented by one only of its constituent pulse transformers, being the pulse transformer associated with the group of storage devices 18 to 21 of the left-hand register 10.

Figure 2:
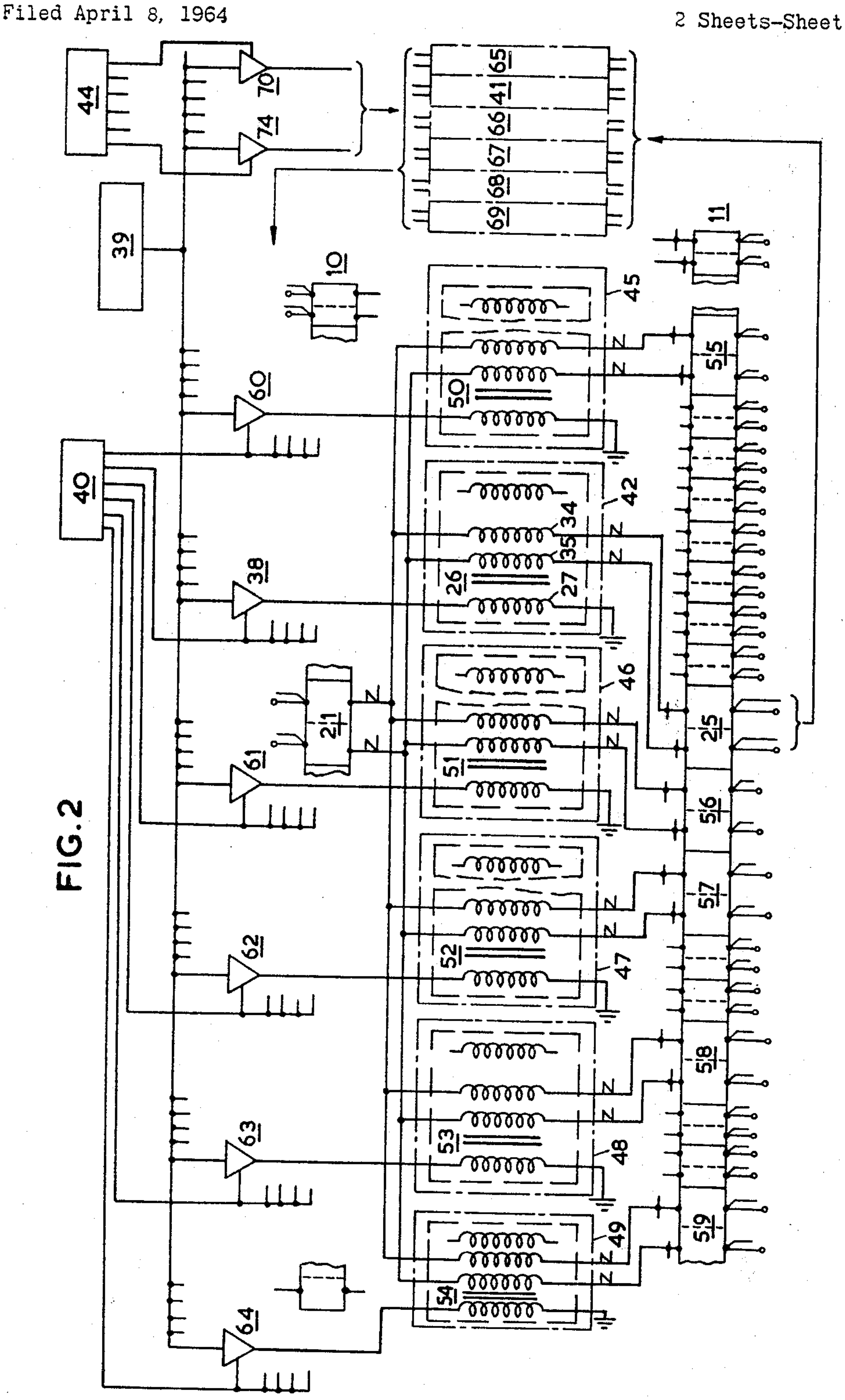

Furthermore, for the sake of simplicity only the storage device 21 of register 10 and the associated secondary windings of the associated pulse transformers are shown in FIG. 2. The description which follows now will be specifically related to the parts shown in the FIG. 2, but it should be understood that this description is typical also of the other similar parts of the apparatus which are not specifically shown in the FIG. 2.

The output terminals of the storage device 21 are connected through corresponding pairs of secondary windings on each of the associated pulse transformers 50 to 54 with the input terminals of the storage devices 55 to 59 of the right-hand register 11 which are displaced by different numbers of storage devices from the corresponding storage device 25 of the register 11. The storage devices 56 to 59 are displaced one, two, five and eight devices respectively in one sense from the corresponding device 25, whilst the storage device 55 is displaced eight devices in the opposite sense from the said corresponding storage device 25. The primary windings of the transformers of each group are connected on one side to earth and on the other side through groups of gates 60 to 64 to the current pulse supply source 39, the gates 60 controlling the current flow to the primary windings of the transformers of group 45, the gates 61 controlling the current flow to the primary windings of the transformers of group 46, and so on. The groups of gates 60 to 64 have control circuits for receiving control pulses from the respective other output circuits of the control device 40.

For the purpose of transferring data from the storage devices of the right-hand register 11 to storage devices of the left-hand register 10 which are displaced away from corresponding storage devices of the register 10, five further groups 65 to 69 of pulse transformers are provided. These further groups of pulse transformers are similar to the groups 45 to 49 and have primary windings supplied through gates 70 to 74 from the current pulse supply source 39, the respective groups of gates 70 to 74 having control circuits for energisation by the respective other output circuits of the control device 44.

The data transfer apparatus depends for its operation on the following fundamental action for transferring data stored in one storage device in one register to a storage device in the other register.

Each of the storage devices comprises an electric circuit arrangement which includes two parallel circuits each of which includes in series a transistor and a collector load resistor, the emitter of each transistor being earthed. For each transistor base is provided a base biasing potential dividing circuit for holding the base of the transistor at a potential dependent on the collector potential of the other transistor, so that the two transistors may operate stably in known manner in complementary conducting and non-conducting states. SET and RESET input terminals are connected to the bases of the respective transistors, whilst TRUE and COMPLEMENT output terminals are connected with the collectors of the respective transistors, the TRUE output terminal being associated with the transistor whose base is connected with the RESET terminal.

When the storage device is set in the UNIT state representing the storage of a binary UNIT signal, the TRUE output terminal carries a potential of ZERO volts whilst the COMPLEMENT output terminal carries a potential of −5 volts, and vice versa when the storage device is reset in the ZERO state. To cause a change in state of the device a positive potential must be applied to the appropriate then-negative input terminal of the then-conducting transistor, that is to say to the SET input terminal when the device is in the ZERO state, and to the RESET input terminal when the device is in the UNIT state.

Each of the pulse transformers is arranged so that on energisation of its primary winding by a current pulse equal E.M.F.'s, of +3.5 volts are induced in the several secondary windings, these E.M.F.'s acting in a sense such as to apply to the SET and RESET terminals of a storage device of register 11 potential pulses of magnitudes of +3.5 and −1.5 volts respectively when the corresponding bi-stable device of the register 10 is in the UNIT state, and of magnitudes −1.5 and +3.5 volts respectively when the said corresponding bi-stable device is in the ZERO state. The bi-stable device of the register 11 will thus be changed to a state in accordance with that of the corresponding device of the register 10 whenever the state of the device of register 11 is not already in accordance with the state of the device of the register 10 at the time the primary winding of the pulse transformer is energised.

It will therefore be appreciated that by causing the control device 40 to supply control signals to the gates such as 38 the primary windings of all of the pulse transformers of group 42 may be energised simultaneously by current pulses from the source 39, so that the data stored in the storage devices of the left-hand register 10 may be transferred simultaneously in a parallel manner into the corresponding storage devices of the right-hand register 11. Similarly by causing the second control device 44 to supply control signals to the gates such as 43 the primary windings of all of the transformers of the group 41 may be energised simultaneously to cause the data stored in the storage devices of the right-hand register 11 to be transferred simultaneously in a parallel manner into the corresponding storage devices of the left-hand register 10.

Likewise by causing the control devices 40 and 44 to supply control signals to any selected one of the other groups of gates 60 to 64 or 70 to 74, the data stored in the storage devices of one register may be transferred into storage devices of the other register which are all displaced a selected number of devices away from the corresponding devices in that other register.

By appropriate operation of the control devices 40 and 44 data appearing in the storage devices of one register may in effect be shifted any number of storage devices along that register by transferring the data from that register to the other register and back one or more times, making during any or all of the transfers appropriate displacements of the data. With this apparatus it is possible to make shifts of the data in any one register of any selected magnitude, within the operating range of the apparatus, by making two successive transfers between the registers after first making, if necessary, either an even number of transfers at the maximum displacement of eight devices, or an odd number of transfers at the maximum displacement of eight devices followed by a single transfer with no displacement.

Some economy may be made in the number of pulse transformers required by dispensing with those associated with the storage devices of the register 10 which would tend to displace data beyond the ends of the register 11, such transfers normally displacing data into storage devices situated at the opposite end of the other register 11. For example, in an apparatus having in each register forty eight similar storage devices, each storage device of the register 10 which is situated further than seven devices from an end of the register has pulse transformer groups for transferring data to the register 11 with displacements of zero, one, two, five and minus eight in one direction relative to the registers, whilst each storage device of the register 11 has pulse transformer groups for transferring data to the register 10 with displacements of zero, one, two, five, eight and minus eight in the opposite direction relative to the registers. To avoid with this arrangement the possibility of losing information on any penultimate transfer, two extra storage devices are added at the end of the register 11. Furthermore a similar addition of two extra storage devices to the end of the register 10 allows the process of data shifting to be terminated in the register 11, instead of in the register 10, without the possibility of loss of data on any penultimate transfer arising.

In other similar apparatus having different numbers of storage devices per register and different magnitudes of possible displacements, other numbers of extra storage devices may have to be added at the ends of the registers to avoid the possibility of such loss of data on any penultimate transfer.

Whilst the above apparatus uses pulse transformers which have four pairs of secondary windings for transferring simultaneously data from four storage devices, these could be replaced by fewer or more pulse transformers having appropriately more or fewer pairs of secondary windings respectively for transferring simultaneously data from more or fewer storage devices respectively. For example, pulse transformers having but a single pair of secondary windings could be used, but this leads to an extraordinarily high number of pulse transformers in the apparatus, and in general it is desirable to place as many pairs of secondary windings on each pulse transformer as is possible in practice.

Other forms of electric bi-stable devices may be used in place of those described above, provided they respond in the same manner to SET and RESET input signals to produce TRUE and COMPLEMENT output signals of the sort described above.

What we claim as our invention and desire to secure by Letters Patent is:

1. An electric data transfer arrangement comprising a first group of bi-stable electric storage devices, a second group of bi-stable electric storage devices, each such storage device having SET and RESET input terminals for receiving SET and RESET input potential signals and TRUE and COMPLEMENT output terminals for delivering complementary output potential signals characteristic of the stable state of the device, a first group of pulse transformers for transferring data from the storage devices of the said first group into corresponding storage devices of the said second group, each such pulse transformer having a primary winding for energisation by a source of current pulses, a first secondary winding connected between the TRUE output terminal of a storage device in the said first group and the SET input terminal of the corresponding storage device in the said second group, and a second secondary winding connected between the COMPLEMENT output terminal of the said storage device in the said first group and the RESET input terminal of the said corresponding storage device in the said second group, the TRUE and COMPLEMENT output signals of each storage device in the said first group being ineffective on their own to cause any change in the state of the corresponding storage device in the said second group if the state of that storage device is not in correspondence with that of the said storage device in the said first group, and each pulse transformer being arranged to induce on energisation of its primary winding E.M.F.'s in its secondary windings such as in conjunction with the output potentials of the associated storage device in the said first group will cause the associated storage device in the said second group to assume the state corresponding to that of the said associated storage device in the said first group if the said associated storage device in the said second group is not already in that corresponding state, a second group of pulse transformers similar to the said first group of pulse transformers but having their respective pairs of secondary windings connected between the respective pairs of output terminals of the first group of storage devices and the respective pairs of input terminals of storage devices of the second group which are all displaced a predetermined number of devices in a predetermined sense from the respective corresponding devices of the second group, gating means for gating current pulses from a common supply source to the primary windings of either group of pulse transformers whereby to enable data stored in the first group of storage devices to be transferred into corresponding devices of the second group, or into devices of the second group displaced from the said corresponding devices of the second group, a third group of pulse transformers similar to the first group of pulse transformers but having the respective pairs of secondary windings connected between the respective pairs of output terminals of the second group of storage devices and the respective pairs of input termianls of the corresponding storage devices of the first group, and a fourth group of pulse transformers similar to the third group but having the respective pairs of secondary windings connected between the respective pairs of output terminals of the second group of storage devices and the respective pairs of input terminals of the storage devices of the first group which are displaced a predetermined number of devices in a predetermined sense from the corresponding devices of the first group, and a second gating means for gating current pulses from a common supply source to either the third or fourth group of pulse transformers whereby data stored in the second group of storage devices may be transferred into corresponding devices of the first group or into storage devices of the first group which are displaced from the said corresponding devices.

2. An electric data transfer arrangement comprising a first group of bi-stable electric storage devices, a second group of bi-stable electric storage devices, each such storage device having SET and RESET input terminals for receiving SET and RESET input potential signals and TRUE and COMPLEMENT output terminals for delivering complementary output potential signals characteristic of the stable state of the device, a first group of pulse transformers for transferring data from the storage devices of the said first group into corresponding storage devices of the said second group, each such pulse transformer having a primary winding for energisation by a source of current pulses, a first secondary winding connected between the TRUE output terminal of a storage device in the said first group and the SET input terminal of the corresponding storage device in the said second group, and a second secondary winding connected between the COMPLEMENT output terminal of the said storage device in the said first group and the RESET input terminal of the said corresponding storage device in the said second group, the TRUE and COMPLEMENT output signals of each storage device in the said first group being ineffective on their own to cause any change in the state of the corresponding storage device in the said second group if the state of that storage device is not in correspondence with that of the said storage device in the said first group, and each pulse transformer being arranged to induce on energisation of its primary winding E.M.F.'s in its secondary windings such as in conjunction with the output potentials of the associated storage device in the said first group will cause the associated storage device in the said second group to assume the state corresponding to that of the said associated storage device in the said first group if the said associated storage device in the said second group is not already in that corresponding state, a plurality of other groups of pulse transformers each similar to the said first group but having the respective pairs of secondary windings connected between the respective pairs of output terminals of the first group of storage devices and the respective pairs of input terminals of storage devices of the second group which are displaced a predetermined number of devices in a predetermined sense from the corresponding devices of the second group, the displacement being different for each of the said other groups of pulse transformers, gating means for gating current pulses from a common supply source to the primary windings of any selected group of pulse transformers whereby data stored in the first group of storage devices may be transferred into corresponding storage devices of the second group, or into storage devices of the second group which have a selected displacement from the said corresponding devices, a further group of pulse transformers each similar to those of the other groups of pulse transformers but having the respective pairs of secondary windings connected between the respective pairs of output terminals of the second group of storage devices and the respective pairs of input terminals of the storage devices of the first group which correspond with the respective storage devices of the second group, a second plurality of other groups of pulse transformers each similar to the said further group of pulse transformers but having the respective pairs of secondary windings connected between the respective pairs of output terminals of the second group of storage devices and the respective pairs of input terminals of storage devices of the first group which are all displaced a predetermined number of devices in a predetermined sense from the devices of the first group which correspond with the respective devices of the second group, the displacement being different for each of this second plurality of other groups of pulse transformers, and a second gating means for gating current pulses from the common supply source to the primary windings of any selected group of pulse transformers whereby to enable data stored in the second group of storage devices to be transferred into corresponding storage devices of the first group or into storage devices of the first group having a selected displacement from the said corresponding devices.

3. An electric parallel data transfer means comprising first and second similar groups of bi-stable electric storage devices, each storage device having SET and RESET input terminals for receiving SET and RESET input potential signals and TRUE and COMPLEMENT output terminals for delivering complementary output potential signals characteristic of the stable state of the devices, a pulse transformer having a primary winding for energisation by a source of current pulses and a plurality of similar pairs of secondary windings, each pair of secondary windings being associated with the corresponding storage devices in the said first and second groups and comprising a first secondary winding connected between the TRUE output terminal of the storage device of the first group and the SET input terminal of the corresponding storage device of the second group, and a second secondary winding connected between the COMPLEMENT output terminal of the storage device of the first group and the RESET input terminal of the corresponding storage device of the second group, the TRUE and COMPLEMENT output signals of each storage device of the first group being ineffective on their own to cause any change in the state of the corresponding storage device of the second group if the state of this latter storage device is not in correspondence with that of the said storage device of the first group, and the plus transformer being arranged to induce on energisation of the primary winding E.M.F.'s in the secondary windings such as in conjunction with the output potentials of the storage devices of the first group will cause the storage devices of the second group to assume states corresponding to those of the corresponding storage devices of the first group if the storage devices of the second group are not already in the corresponding states, a plurality of other pulse transformers, each being similar to the first pulse transformer but having its respective pairs of secondary windings connected between the respective pairs of output terminals of the storage devices of the first group and the respective pairs of input terminals of storage devices of the second group which are displaced a predetermined number of devices in a predetermined sense from the devices of the second group which correspond with those of the first group, the displacement being different for each of the pulse transformers, gating means for gating current pulses from a common supply source to the primary windings of any selected pulse transformer whereby to enable data stored in the first group of storage devices to be transferred into corresponding storage devices of the second group or to storage devices of the second group having a selected displacement from the respective corresponding storage devices of the second group, a further pulse transformer similar to the first pulse transformer but having its respective pairs of secondary windings connected between the respective pairs of output terminals of the storage devices of the second group and the respective pairs of input terminals of the corresponding storage devices of the first group, and a plurality of other pulse transformers similar to the said further pulse transformer but having their respective pairs of secondary windings connected between the respective pairs of output terminals of the storage devices of the second group and the respective pairs of input terminals of storage devices of the first group which are displaced a predetermined number of devices in a predetermined sense from the storage devices of the first group which correspond with those of the second group, the displacement being different for each of the pulse transformers, and second gating means for gating current pulses to the said further pulse transformer or to any selected pulse transformer of the said second plurality from a common supply source whereby to enable data stored in the second group of storage devices to be transferred into corresponding storage devices in the first group or into storage devices of the first group having a selected displacement from the respective corresponding devices of the first group.

References Cited

UNITED STATES PATENTS 3,235,847 2/1966 Graham ---------- 340—174

STANLEY M. URYNOWICZ, Jr., *Primary Examiner.*